United States Patent [19]
Nolan

[11] Patent Number: 5,812,978
[45] Date of Patent: Sep. 22, 1998

[54] WHEELCHAIR VOICE CONTROL APPARATUS

[75] Inventor: Daniel A. Nolan, Annandale, Va.

[73] Assignee: Tracer Round Associaties, Ltd., Alexandria, Va.

[21] Appl. No.: 762,804

[22] Filed: Dec. 9, 1996

[51] Int. Cl.$^6$ ........................................ G01L 3/00
[52] U.S. Cl. .......................................... 704/275; 704/270
[58] Field of Search ..................... 704/275, 270

[56] References Cited

U.S. PATENT DOCUMENTS

| | | | |
|---|---|---|---|
| 4,207,959 | 6/1980 | Youdin et al. | ............................ 704/275 |
| 4,281,734 | 8/1981 | Johnston . | |
| 4,407,393 | 10/1983 | Youdin et al. . | |
| 4,483,405 | 11/1984 | Noda et al. . | |
| 4,580,782 | 4/1986 | Ochi . | |
| 4,807,273 | 2/1989 | Haendle . | |
| 4,865,610 | 9/1989 | Muller . | |
| 5,033,000 | 7/1991 | Littlejohn et al. . | |
| 5,123,495 | 6/1992 | Littlejohn et al. . | |
| 5,126,731 | 6/1992 | Cromer, Jr. et al. . | |
| 5,233,662 | 8/1993 | Christensen . | |
| 5,248,007 | 9/1993 | Watkins et al. . | |
| 5,275,248 | 1/1994 | Finch et al. . | |
| 5,335,313 | 8/1994 | Douglas | .................................. 704/275 |
| 5,345,538 | 9/1994 | Narayannan et al. . | |
| 5,365,026 | 11/1994 | Cromer, Jr. et al. . | |
| 5,493,618 | 2/1996 | Stevens et al. . | |
| 5,497,056 | 3/1996 | Kurland et al. . | |
| 5,555,949 | 9/1996 | Stallard et al. . | |

*Primary Examiner*—David R. Hudspeth
*Assistant Examiner*—Robert Louis Sax
*Attorney, Agent, or Firm*—Lane, Aitken & McCann

[57] ABSTRACT

A voice-controlled wheelchair has a control system having a plurality of modes of operation in each of which only a limited number of commands for moving the wheelchair are executed. The commands are entered by a throat-engaging microphone, and backup commands are also recognized, including a command based on an excited utterance to stop the wheelchair. The control system is switchable by voice command between a first condition in which it executes other commands and a second condition in which it does not execute other commands.

20 Claims, 5 Drawing Sheets

SYSTEM COMPONENT INTEGRATION DIAGRAM

WHEELCHAIR VOICE CONTROL APPARATUS

BACKGROUND OF THE INVENTION

1. Field of the Invention

The present invention relates to a system for controlling the operation of power-driven equipment, particularly motorized wheelchairs, by voice commands.

2. Description of the Prior Art

Particularly for persons paralyzed from the neck down, the problem of operating a motorized wheelchair has been great.

Various methods have been proposed for allowing disabled persons, including a quadriplegic, to control a motorized wheelchair. For example, breath-controlled wheelchair systems have been proposed in which a disabled person controls the chair by sucking or blowing into one or more tubes. The degree of control which can be provided is limited by the number of tubes used.

Voice-controlled wheelchairs have also been proposed, but the variety and precision of the control they afforded was less than is desirable. Furthermore, there was a problem with commands being heard by the control system and the potential for the control system responding to a false command picked up from ambient noise, such as from the voices of people around the wheelchair.

SUMMARY OF THE INVENTION

In accordance with a preferred but nonetheless illustrative embodiment of the invention, a wheelchair-mounted control system is provided which includes a voice processor which has the capability of converting a preselected set of words or other sounds spoken by the wheelchair's operator as commands into a corresponding set of computer recognizable signals. The preselected set of vocal sounds comprises the commands necessary to control the state of a wheelchair, that is, whether the wheelchair is at rest, moving forward, pivoting left, etc. The control system also includes a computer programmed to respond to the appropriate signals it receives from the voice processor to selectively activate a set of control lines which, in turn, cause a wheelchair controller to control the wheelchair in the manner specified by the commands given by the operator.

A set of commands is programmed into the computer by a training session in which reference commands are entered into the computer by the wheelchair operator to serve as a basis for comparison with actual voice commands to be given during the operation of the wheelchair. The reference commands can be in any spoken language and can even be in the form of non-language sounds, such as coughs, guttural sounds or hums, for operators who are unable to speak words.

The control system is arranged to accommodate backup commands in case a principal command is not recognized or not given. The backup commands can include commands having sounds which are likely to be recognized if the initial commands are not recognized. The backup commands can also include emergency commands, such as an exclamation likely to be uttered by the operator in a panic situation to stop the wheelchair. It is also contemplated that any of the commands can be based on the characteristic frequencies of the operator's voice, such that the frequencies of the sounds given as commands must match the frequencies entered into the memory of the computer during the training session in order that the system recognizes and responds to the commands.

The control system operates in various modes, in at least one of which the control system recognizes and responds to fewer than all of sounds, or commands, that the control system recognizes and responds to overall. For example, in a STOP mode, the control system does not recognize a sound or command to GO LEFT, whereas the same command given while the control system is in a FORWARD mode causes the wheelchair to turn to the left by a predetermined amount while moving forward and to continue to move forward in the new direction.

The system includes a microphone applied directly to the larynx of the operator and shielded by outside coverings to prevent input to the system of vocal commands from persons around the operator. A display visible to the operator indicates the vocal command being executed by the control system, and an audible indicator alerts the operator to certain system conditions, such as the inability of the system to recognize a command.

Although an illustrative embodiment described herein relates to application of the present invention to a motorized wheelchair, the present invention is also applicable to other motorized and other power-driven devices. The other power-driven devices include, but are not limited to, other vehicles and personal carriers including beds, therapy devices, electromechanically augmented powered skeletal supports, and television, stereo and other electronic equipment.

DETAILED DESCRIPTION OF PREFERRED EMBODIMENT

Figure 1:
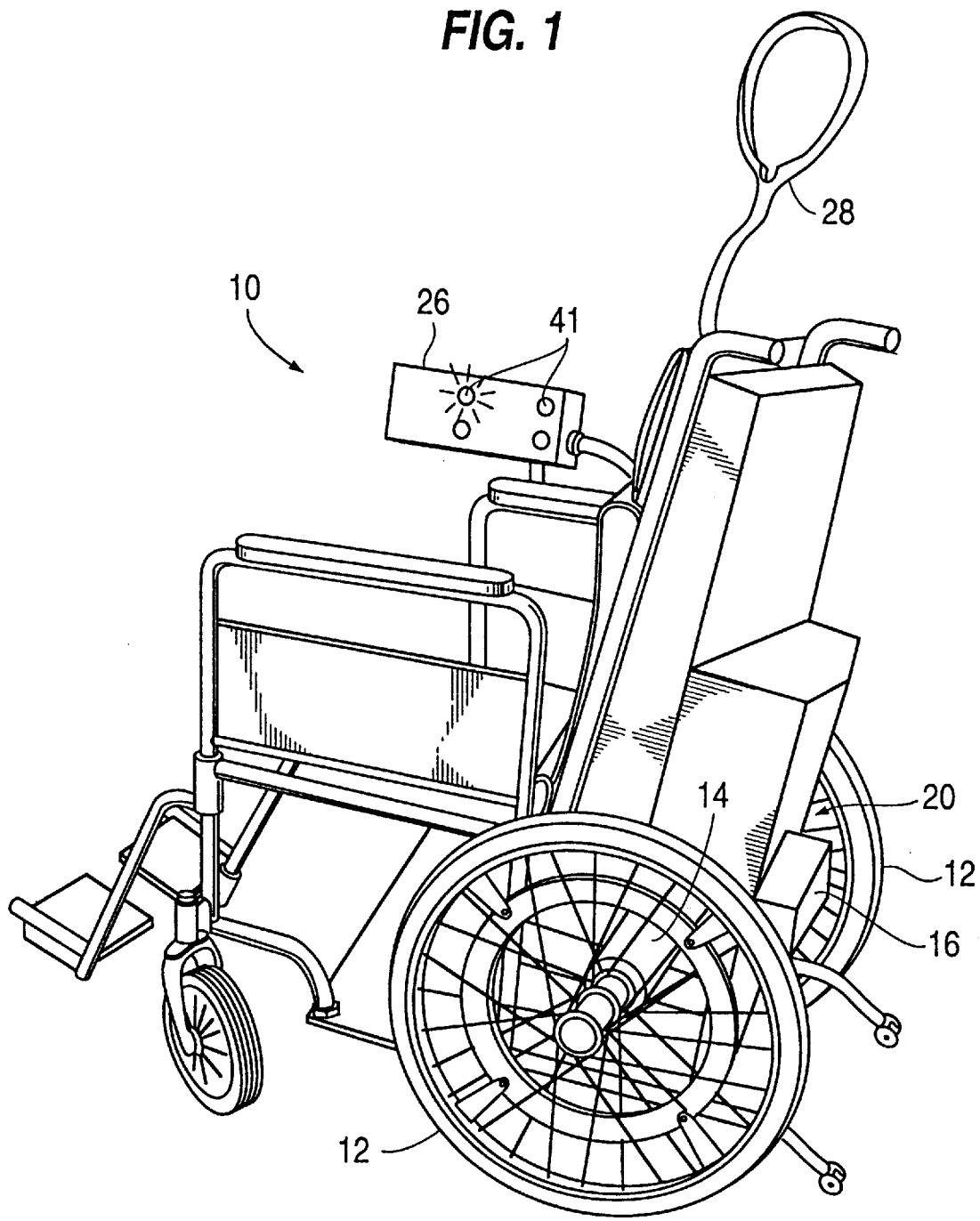
FIG. 1 is a perspective view of a motorized wheel chair employing the control system according to the present invention.

As can be seen from FIG. 1, a wheelchair 10 has main wheels 12, an electric motor 14 drivingly connected to one of the main wheels, and a similar electric motor (not shown) drivingly connected to the other of the main wheels. The electric motors 14 are, for example, DC motors. The wheelchair 10 has two known types of brakes (not shown)—brakes of a first type physically contacting the main wheels 12, and brakes of a second type on the electric motors 14 providing power to the main wheels. The power for driving the motors 14 is from by a conventional battery unit 16 providing 24 volts DC.

Figure 2:
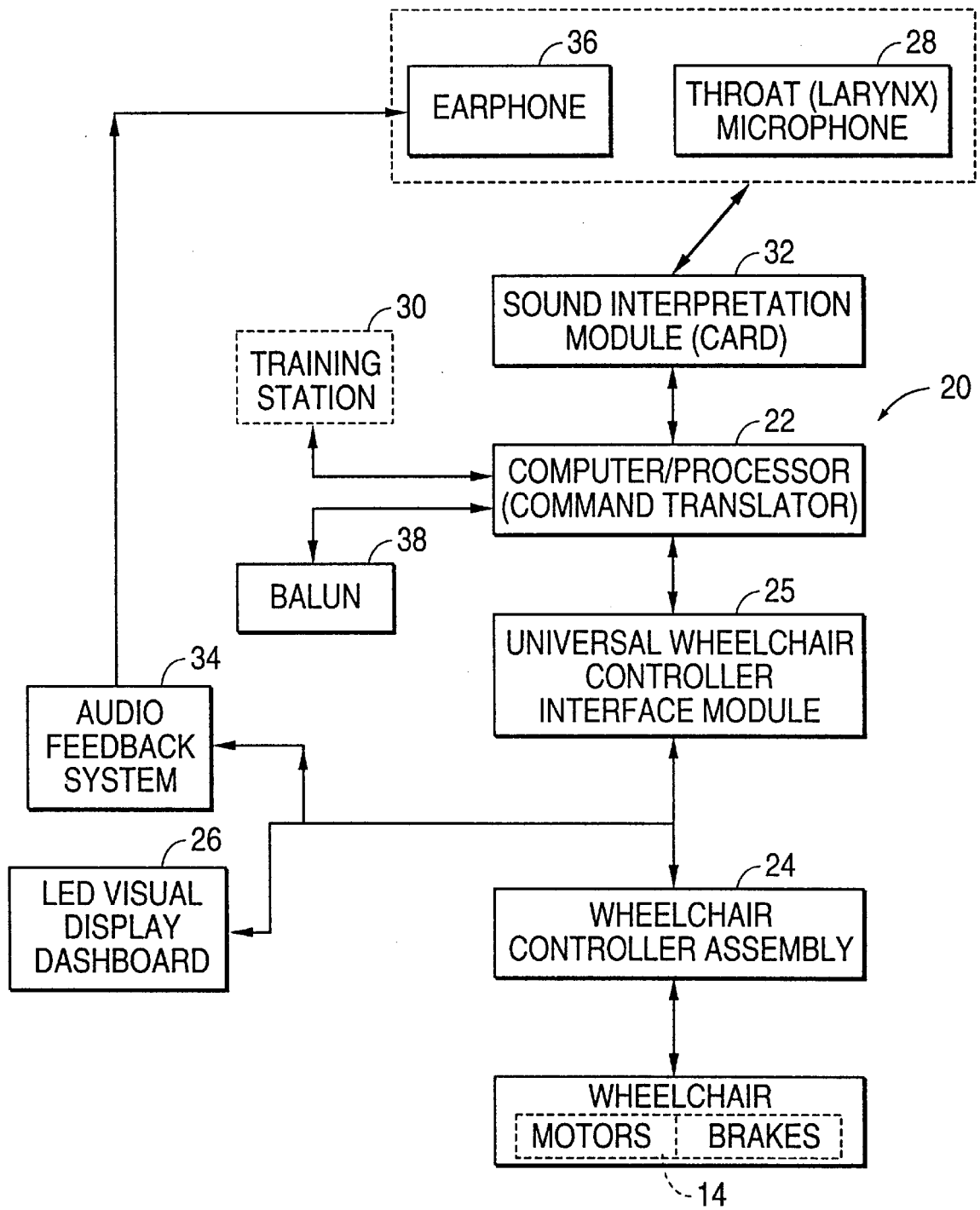
FIG. 2 is a block diagram of the components of the control system according to the present invention.

As can be seen from FIGS. 1 and 2, the wheelchair 10 also comprises a control system designated generally by the numeral 20, the control system including a computer 22, a wheelchair controller assembly 24, a controller interface module 25, an LED visual display 26 mounted in a position where it is visible by the operator, and a microphone 28 for entering commands into the control system. A training station 30, which includes, for example, a keypad, mouse and video monitor, is also provided for programming the control system at a time when the wheelchair is not in normal operation.

A sound interpretation module 32, or card, is known and is installable on the computer 22. A suitable sound interpretation module is commercially available under the name Creative Design Sound Card from Creative Technology Ltd. of Singapore. The computer 20 is connected to the controller interface module 25 through the LED visual display 26, which also acts as a switch box. The controller interface module 25 converts signals from the computer 20 to the opening and closing of electrical circuits in the controller assembly 24 to control the flow of current to the motors 14 and the brakes in various ways to change the states, that is, to control the movement of the wheelchair 10.

The wheelchair controller assembly 24 includes the switches which are actuated and the circuits which are affected by the actuation of the switches to control current to the motors and brakes. The wheelchair controller assembly 24 can comprise a conventional joystick wheelchair controller assembly except that the joystick itself is omitted. Rather than the position of a joystick determining which switches are actuated and, therefore, what combination of motors and brakes is operated, electrical signals are transmitted from the interface controller module 25 to the wheelchair controller assembly 24 to operate the switches. The signals can be in the form of numbers of electrical pulses, wherein certain numbers of pulses actuate certain switches or certain combinations of switches in the wheelchair controller assembly 24. A suitable wheelchair controller assembly is that included with the Arrow Action Storm wheelchair produced by Invacare of Elyria, Ohio.

Figure 3:
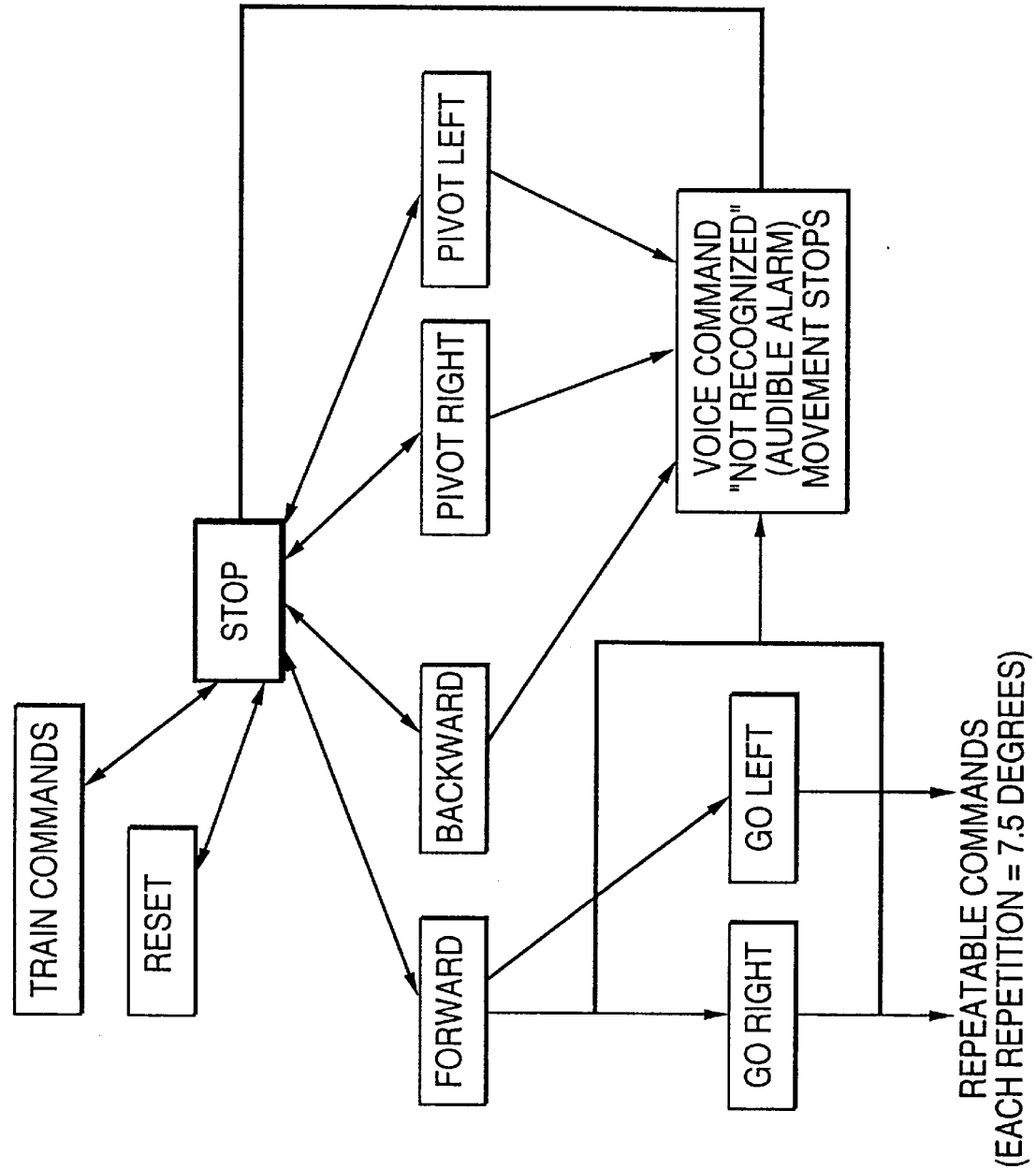
FIG. 3 is a diagram of commands and modes of operation for the control system according to the present invention.

FIG. 3 shows the relationships among various modes of operation of the control system 20, which are identified by commands which can be used to place the control system in the modes. FIG. 3 also reflects the states of the wheelchair 10 after the commands are given. As an example, from a first mode of the control system 20, identified in FIG. 3 by a FORWARD box, and corresponding to a state in which the wheelchair 10 is moving forward, the control system 20 is receptive only to the commands STOP, GO RIGHT, or GO LEFT. The control system 20 responds to these commands by placing the wheelchair in the state indicated by the command. As another example, from a second mode of the control system 20, identified in FIG. 3 by a STOP box, and corresponding to a state in which the wheelchair 10 is stopped, the control system 20 is receptive only to the commands FORWARD, BACKWARD, PIVOT RIGHT, and PIVOT LEFT. Each of the boxes of FIG. 3 except TRAIN COMMANDS, RESET and "NOT RECOGNIZED" represents a command, a mode of the control system 20, and a state of the wheelchair 10. Of course, other commands, modes and states can be used instead of or in addition to those disclosed herein. For each mode of the control system 20 only a very limited number of command options must be searched by the computer 22 before the correct option is found and executed. Thus, the control system 20 provides very quick response to the commands. In the embodiment described herein, no more than four commands must be considered from any particular mode of the control system 20.

In any of the modes illustrated in FIG. 3, the control system 20 is switchable by voice command between a first condition in which the control system is responsive only to a single, prepatory command and a second condition in which the control system is responsive to all or some other commands. For example, the voice command WAKE-UP is a prepatory command which can be used to switch the control system 20 from the first condition described above to the second condition described above. From the second condition, the system recognizes most other commands, such as FORWARD, BACKWARD, PIVOT RIGHT and PIVOT LEFT. In the second condition, the system is also receptive to commands from the training station 30 and a RESET command. From the second condition, the control system 20 is also receptive to a command, such as GO-TO-SLEEP, to return to the first condition.

The control system 20 is also programmable to be responsive to a command to actuate an operation or a series of operations by which the wheelchair moves from a first predetermined position, such as next to a bed, to a second predetermined position, such as one suitable for storing the wheelchair during periods of non-use. In this mode, the wheelchair 10 stops when it reaches the second predetermined position. The control system 20 can also be programmed to recognize and respond to a command to move from the second predetermined position to the first predetermined position and then stop. A command for movement from the first predetermined position to the storage position can be "GO PARK", and a command for movement from the storage position to the first predetermined position can be "COME HERE". These commands are entered through a wireless directional microphone positioned at the first predetermined position.

From a STOP mode of the control system 20 and a STOP state of the wheelchair 10, a variety of commands can be given, such as FORWARD, BACKWARD, PIVOT RIGHT and PIVOT LEFT. For each of the BACKWARD, PIVOT RIGHT and PIVOT LEFT commands, the wheelchair 10 continues in the commanded direction until a STOP command is given, at which time motion ceases. A STOP command also ceases motion when the wheelchair 10 is in a FORWARD state. Other commands, such as GO RIGHT and GO LEFT, are also used when the wheelchair 10 is in the FORWARD state. In such cases, the wheelchair 10 turns a predetermined angle in the commanded direction and continues moving forward in the new direction. Furthermore, repeating GO RIGHT or GO LEFT commands results in further turning in the commanded direction by a further predetermined angle. A predetermined incremental angle of 7.5 degrees has been found to be suitable. As was indicated earlier herein, instead of commands like FORWARD, BACKWARD, etc., the control system 20 can be trained to recognize and respond to any sounds, which thereby have the same effect as the FORWARD, BACKWARD, etc. commands described herein. Each command causes a unique electrical signal or set of electrical signals to be transmitted to the wheelchair controller assembly 24 to achieve a specific change in the state of movement or non-movement of the wheelchair 10.

The control system is arranged to accommodate backup commands in case a principal command is not recognized or not given. The backup commands preferably comprise commands having sounds which are likely to be recognized if the initial commands are not recognized. The following is a list of primary commands, shown in the left column, and a list of the corresponding backup commands shown in the right column.

| Primary command | Back-up/Alternate commands |
|---|---|
| go to sleep | relax |
| wake-up | alert |
| stop | halt |

-continued

| Primary command | Back-up/Alternate commands |
| --- | --- |
| forward | march |
| backward | reverse |
| pivot right | rotate starboard |
| pivot left | rotate port |
| go right | move starboard |
| go left | move port |

The control system recognizes either the primary command or the backup command and takes the commanded action. The backup commands can also include emergency commands, such as an exclamation likely to be uttered by the operator in a panic situation, for example, "Oh, no!", to stop the wheelchair. Any of the commands can be based on the characteristic frequencies of the operator's voice, such that the frequencies of the sounds given as commands must match the frequencies entered into the memory of the computer during the training session.

Any time that a voice command is not recognized by the control system 20 and the wheelchair 10 is moving, the control system causes the wheelchair to stop and emits an audible signal or alarm. The control system 20 acts to stop the wheelchair 10 and emit the signal a short time after a command is not recognized. A suitable time is 0.6 seconds. The control system 20 can be arranged to allow a certain time for recognition of a further command, after a first command is not recognized, before stopping the wheelchair 10 and emitting the signal. The audible signal or alarm is transmitted by an audio feedback system 34 to the operator through an ear phone 36. The use of an ear phone 36 assures that the operator will know that the voice command is not recognized, despite the presence of noise around the operator and despite any hearing loss the operator might suffer from.

The microphone 28 is a throat microphone of a known type which contacts the larynx for clear, positive transmission of sound vibrations and for clear distinction from ambient voices and sounds. Except for a sensing portion which contacts the larynx, the microphone 28 has a covering which shields out ambient sounds and, thereby, prevents the control system 20 from operating in response to a false command from ambient voices and sounds. A suitable microphone is commercially available as Lash II Headset from Television Equipment Associates of South Salem, N.Y.

The computer 22 can be a conventional business or home personal computer operating from the battery unit 16 of the wheelchair 10 through the recharging socket. This ensures that the computer 22 can be removed from the wheelchair 10 so that it may be employed for other purposes when not serving as a mobility device. The battery unit 16 is a standard unit providing 24 VDC and delivering 2.5–5 V to the computer 22. The computer 22 employs reducers and inverters to allow operation with both current from the battery unit 16 and household current. Such a computer is more powerful than is required for the control system 20 but, besides being useful for other purposes when the wheelchair 10 is not in use, the computer is well-suited for easy physical connection to commercially available sound interpretation modules 32. Instead of a personal computer, a microprocessor can be used as the computer 22.

An electronic balun 38, connecting to the computer 22 at the ports for the screen, keyboard and mouse connection, substitutes for the lack of conventional input/output. No keyboard, mouse, joystick or video screen is connected during the operation of the wheelchair 10. The use of the balun 38 allows "hot" attachment of these devices for installation, fitting, maintenance and service at a later date without interrupting operation. The balun device acts as a surrogate for the normal man-machine interfaces which, when not connected or accounted for, require the computer to issue a fault/error condition which prohibits the computer from operating. A suitable balum is the Guardian balun from Raritan Computers, Inc. of Schenectady, N.Y.

Emergency stopping mechanisms can be employed to override any failure in the control system 20, including in the system voice recognition software in the sound interpretation module 32. The first mechanism is an alternate action head switch which is operated by slight movement of the head to deactivate the wheelchair control system. The second is a conventional puff and sip control device readily available to the operator.

The computer 22 controls the controller interface module 25 according to the vocal commands received. The controller interface module 25 controls the controller 24, which controls the motors 14 and brakes. The controller interface module 25 is attached to the normal I/O port of the computer 22, using either parallel or serial methods. The controller interface module 25 converts impulses received from the computer port and translates them into circuit opening or closing functions to open and/or close circuits in the controller assembly 24.

Output from the control system 20 to the operator is necessary for confirmation and to provide meaningful information. The primary means of output employs lamps 42 on the visual display 26, indicating which lines from the controller interface module 25 to the controller assembly 24 are in operation. Two conditions drive audio feedback from the computer 22, the first is an audio bell alarm which rings when the command is not recognized. The second is based on user query. The operator may request system status or request audio confirmation of command or available/ acceptable word commands which have been programmed.

The training station 30, which is usually detached and used only during training, includes a computer video screen, a computer keyboard, a mouse, trackball or other cursor control device, and an optional modem, if it is not contained in the computer 22 mounted on the wheelchair 10. Since the control system 20 must be "trained" to recognize the individual voice (pitch, accent, etc), the commands needed to move the particular model of chair need to be installed.

Figure 4:
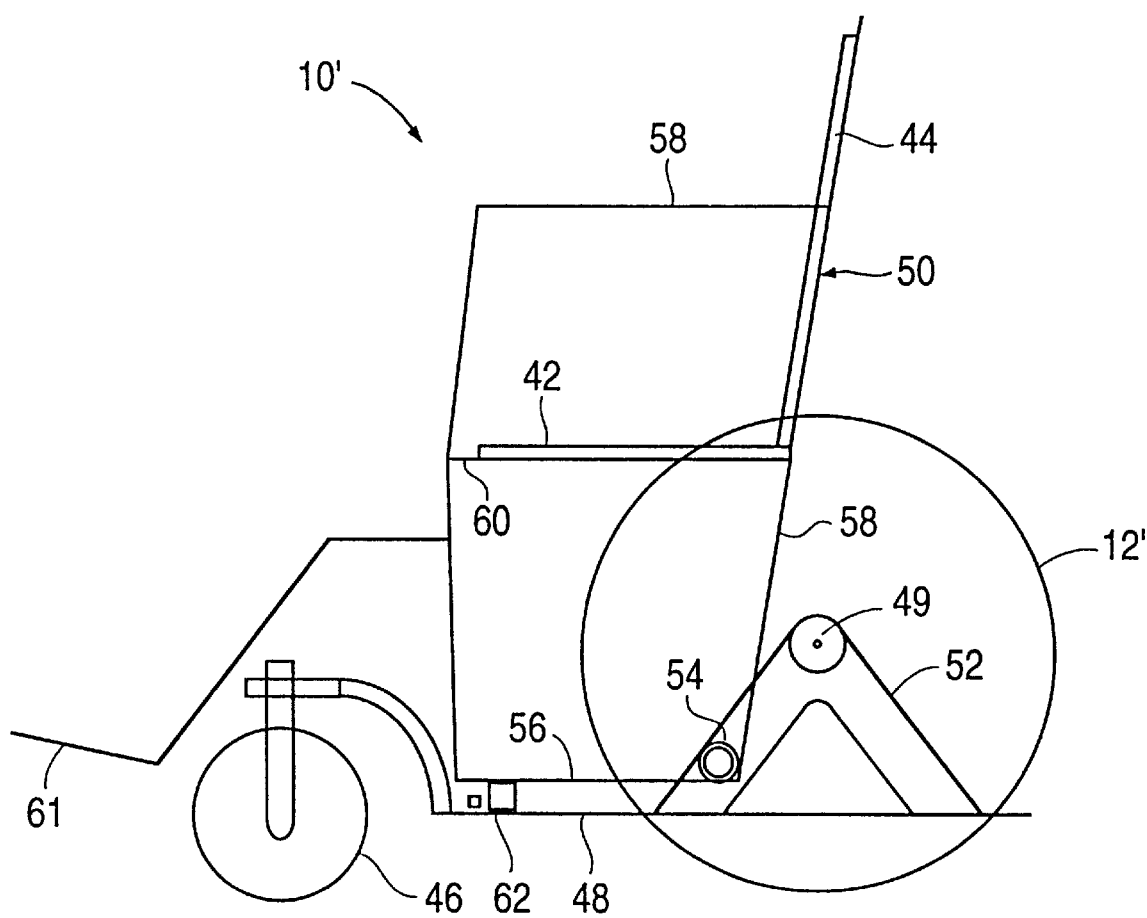
FIG. 4 is a schematic view of a wheel chair according to the present invention showing a mechanism for reclining the operator.
Figure 5:
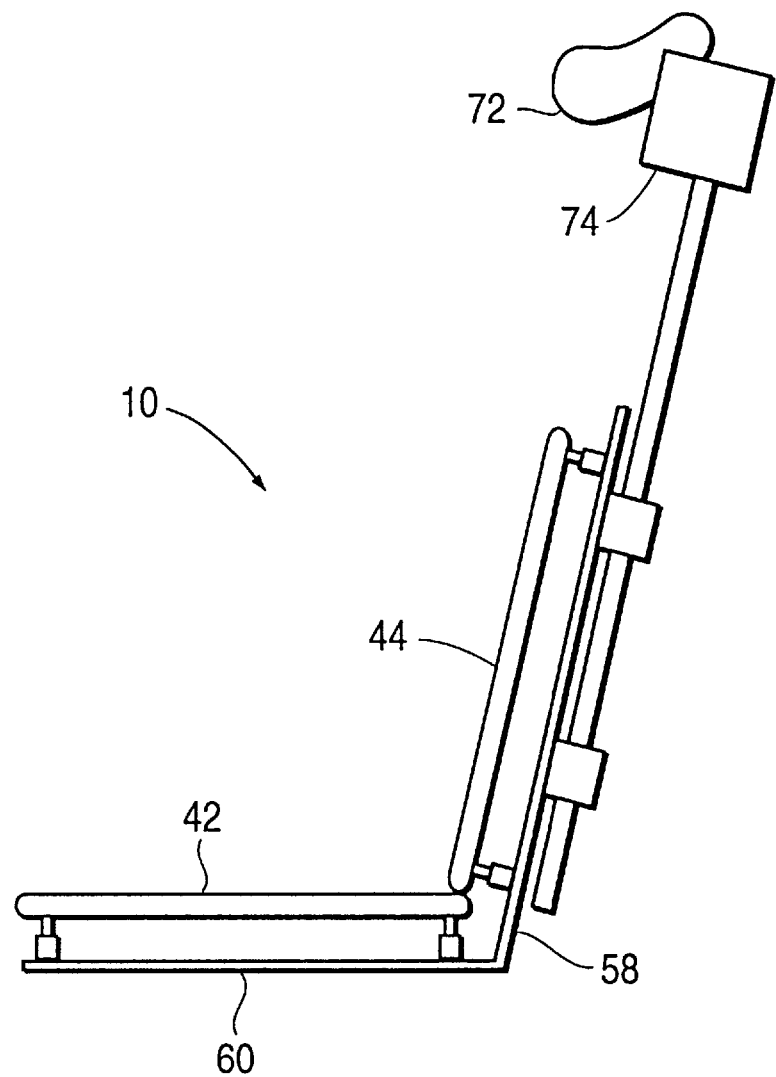
FIG. 5 is a schematic view of an arrangement for adjusting the positions of the seat and seat back of a wheelchair according to present invention.

As can be appreciated from FIGS. 4 and 5, vocal sounds can be used with the motorized wheelchair 10' according to the present invention not only to control the travel of the wheelchair, but also to control the states of other devices, such as devices to control other functions associated with the wheelchair. For example, as can be seen from FIG. 4, the control system 20 according to the present invention can be used to control, by voice command, a tilt or recline position of a seat 42 and seat back 44 of the wheelchair 10'. In FIG. 4, the wheelchair 10' according to the present invention is shown having main wheels 12', pivoting wheels 46, a platform 48 supported by the main wheels and pivoting wheels and a seat frame 50 supported for tilting, or reclining, movement relative to the platform 48. In the embodiment shown in FIG. 4, a connecting member 52 connects the platform 48 to a hub 49 of the main wheels 12', and the seat frame 50 is pivotally mounted relative to the platform by a pivot connection 54 secured to the connecting member 52. The seat frame 50 includes a base member 56 and an upright member 58 at a fixed orientation relative to the base member. The seat frame 50 also includes arms 58 and members 60 for supporting the seat 42. Foot rests 61 are connected to the seat frame 50 for movement therewith. A control device 62, such as a servomechanism of a type which is conventional, is connected between the platform 48 and the base member 56 of the seat frame 50. The control device 62 includes an element which is moveable in response to a signal from the control system 20 to increase or decrease the height of a forward end of the base member 56 of the seat frame 50 to increase or decrease the amount of recline of the seat 42 and the seat back 44, along with the arms 58 and the foot rests 61. Thus, the control device 62 is controlled in much the same manner as the motors 14 and brakes of the wheelchair 10'.

As can be appreciated from FIG. 5, vocal sounds can also be used with the wheelchair 10 according to the present invention to adjust the positions of the seat 42 and the seat back 44. Both the seat 42 and the seat back 44 may have cushions of various configurations. Control devices 64, 68 and 70, such as servomechanisms, are positioned between the seat support member 60 and the seat 42, and between the upright member 58 and the seat back 44. Various combinations of actuation of the individual control devices 64–70 provide the capability to move the seat 42 and the seat back 44 in various ways. For example, the seat 42 can be raised or lowered and/or tilted forward or rearward. Similarly, the seat back 44 can be moved forward or rearward and/or tilted more forward or more rearward. Various known arrangements of seats, seat backs and servomechanisms can be used, the important consideration being that they are operable by voice commands in connection with the present invention.

Some wheelchair operators are unable to support their heads. Accordingly, supports are known for holding up the head of a wheelchair operator. As can be seen from FIG. 5, the wheelchair 10 according to the present invention includes a head support 72 connected to the wheelchair through, for example, the generally upright member 58 of the seat frame 50. The head support 72 is connected to a head support adjustment mechanism 74 containing an arrangement of one or more servomechanisms for turning the head to the right and left and for tilting the head forward or rearward. The adjustment mechanism 74 is connected to the control system 20 and is controlled by vocal sounds in a manner similar to the manner in which the motion of the wheelchair 10 and the associated equipment, such as the seat 42, are controlled. For example, the turning of the head can be controlled with commands such as ROTATE LEFT and ROTATE RIGHT.

The voice commands of the wheelchair operator are entered into the memory of the computer 22, and these stored commands are later compared with commands received during the operation of the wheelchair 10. When a command received during operation matches a command entered during the training session, the wheelchair responds to the commands. If commands do not match, the wheelchair 10 does not enact the command given and, thereby, the wheelchair is prevented from responding to commands which include either the wrong terms or the right terms, at the wrong pitch, accent, etc.

It will be apparent to those skilled in the art and it is contemplated that variations and/or changes in the embodiments illustrated and described herein may be made without departure from the present invention. For example, the system can be used with beds having motors to change the position of the occupant, and the like. As another example, although the present invention has been specifically disclosed with reference to motorized equipment, particularly motorized wheelchairs, it is applicable to equipment which is not motorized and yet is controllable by the input of electrical signals. For example, the system can be used with television, in which a state can include being set to receive a particular channel or to produce a certain volume of sound. As other examples, the system can also be used with stereo equipment and other electronics. Accordingly, it is intended that the ongoing description is illustrative only, not limiting, and that the true spirit and scope of the present invention will be determined by the appended claims.

I claim:

1. A system for controlling a motorized wheelchair by vocal sounds from an operator, wherein the motorized wheelchair can be in any one of a plurality of states, including states of movement and non-movement of the motorized wheelchair, comprising:

control means responsive to electrical signals to change the state of the motorized wheelchair from any one of the plurality of states to another, wherein each of the electrical signals corresponds to a change of state;

means for converting vocal sounds into a plurality of said electrical signals;

means for transmitting said vocal sounds from the operator to said converting means, a seat, and means for tilting the seat relative to a support surface for the wheelchair, wherein said system has a plurality of modes, said converting means in at least one of said modes of said system being capable of converting fewer than all of the plurality of vocal sounds into said electrical signals, whereby the motorized wheelchair can be changed to another one of said plurality of states, but not to any other one of said plurality of states, when said converting means is in said at least one mode, and wherein the system has a mode in which said converting means converts vocal sounds into electrical signals for tilting the seat.

2. The system of claim 1, wherein said converting means, in several of said modes, converts fewer than all of said vocal sounds into electrical signals, the vocal sounds converted when said converting means is in a first of said several modes comprising a first set, and the vocal sounds converted when said converting means is in a second of said several modes comprising a second set, wherein said first set is different from said second set.

3. The system of claim 1, further comprising means for indicating visually the mode of operation of the system.

4. The system of claim 1, wherein the system has a first condition in which the means for converting vocal sounds into the plurality of electrical signals and a second condition in which the means for converting vocal sounds does not convert vocal sounds into any of the plurality of electrical signals, the system being switchable between the first and second conditions by other vocal sounds.

5. The system of claim 1, wherein the system has a mode in which the system is responsive to a vocal sound to move the wheelchair from a first predetermined position to a second predetermined position.

6. The system of claim 1, further comprising means for emitting an audible alarm in response to failure of the system to recognize a vocal sound from the operator.

7. The system of claim 6, wherein said means for emitting an audible alarm comprises an earpiece to be worn by the operator.

8. The system of claim 1, wherein said means for converting vocal sounds comprises means for converting a plurality of different sounds into the same electrical signal, whereby either of a primary command and a backup command is executed by the system.

9. The system of claim 1, wherein one of said vocal sounds is a vocal sound likely to be uttered by the operator in a state of panic.

10. A system for controlling power driven equipment by a vocal sound from an operator, wherein the equipment can be in any one of a plurality of states, comprising:

control means responsive to at least one electrical signal to change the state of the power driven equipment;

means for converting a vocal sound into said at least one electrical signal; and means for transmitting said vocal sound from the operator to said converting means while preventing transmission to said converting means of sounds similar to said vocal sound, said transmitting means comprising a microphone engaging the larynx region of the operator.

11. The system of claim 10, wherein the system is a system for controlling power driven equipment by a plurality of vocal sounds from the operator, the control means comprises control means responsive to a plurality of electrical signals, and the system has a plurality of modes, said converting means in at least one of said modes of said system being capable of converting fewer than all of the vocal sounds into said electrical signals, whereby the equipment can be changed from one of said plurality of states to another one of said plurality of states, but not to any other one of said plurality of states, when said converting means is in said at least one mode.

12. The system of claim 11, wherein said converting means, in several of said modes, converts fewer than all of said vocal sounds into electrical signals, the vocal sounds converted when said converting means is in a first of said several modes comprising a first set, and the vocal sounds converted when said converting means is in a second of said several modes comprising a second set, wherein said first set is different from said second set.

13. The system of claim 10, wherein said equipment is a motorized wheelchair, and the states of the equipment include states of movement and non-movement of the motorized wheelchair.

14. The system of claim 11, further comprising means for indicating visually the mode of operation 6f the system.

15. The system of claim 10, wherein the system is a system for controlling power driven equipment by a plurality of vocal sounds, the control means comprises control means responsive to a plurality of electrical signals, and the system has a first condition in which the means for converting vocal sounds into the plurality of electrical signals and a second condition in which the means for converting vocal sounds does not convert vocal sounds into any of the plurality of electrical signals, the system being switchable between the first and second conditions by other vocal sounds.

16. The system of claim 10, wherein the system has a mode in which the system is responsive to a vocal sound to move the power driven equipment from a first predetermined position to a second predetermined position.

17. The system of claim 10, further comprising means for emitting an audible alarm in response to failure of the system to recognize a vocal sound from the operator.

18. The system of claim 10, wherein said means for converting a vocal sound comprises means for converting a plurality of different sounds into the same electrical signal, whereby either of a primary command and a backup command is executed by the system.

19. The system of claim 10, wherein said equipment is a motorized wheelchair, the wheelchair comprises a seat and means for tilting the seat relative to a support surface for the wheelchair, and wherein said system has a plurality of modes, said converting means in at least one of said modes of said system being capable of converting fewer than all of the plurality of vocal sounds into said electrical signals, whereby the motorized wheelchair can be changed to another one of said plurality of states, but not to any other one of said plurality of states, when said converting means is in said at least one mode, and wherein the system has a mode in which said converting means converts vocal sounds into electrical signals for tilting the seat.

20. The system of claim 10, wherein the system is a system for controlling power driven equipment by a plurality of vocal sounds from the operator, and one of said vocal sounds is a vocal sound likely to be uttered by the operator in a state of panic.

* * * * *